United States Patent [19]

Levenspiel et al.

[11] 4,272,893
[45] Jun. 16, 1981

[54] ENHANCING THE CHARACTERISTICS OF MAGNETICALLY STABILIZED FLUIDIZED BEDS

[75] Inventors: Octave Levenspiel, Corvallis, Oreg.; Kenneth Kamholz, Cherry Hill, N.J.

[73] Assignee: Exxon Research & Engineering Co., Florham Park, N.J.

[21] Appl. No.: 18,060

[22] Filed: Mar. 6, 1979

Related U.S. Application Data

[62] Division of Ser. No. 711,500, Aug. 4, 1976, Pat. No. 4,143,469.

[51] Int. Cl.$^3$ .............................................. F26B 3/08
[52] U.S. Cl. ........................................... 34/1; 34/10; 34/57 A; 423/DIG. 16; 366/101; 366/273; 518/715
[58] Field of Search ............... 34/1, 10, 57 A; 432/15, 432/58; 423/DIG. 16; 23/288 S; 110/245; 406/89, 90; 366/101, 106, 107, 273, 274; 260/449.6 M

[56] References Cited

U.S. PATENT DOCUMENTS 4,115,927  9/1978  Rosensweig ........................... 34/10

OTHER PUBLICATIONS

The Effect of a Magnetic Field on a Ferromagnetic Particle Suspension Bed–M. V. Filippov–Prikladnaya magnitogidrodinamika–1960.

Primary Examiner—Larry I. Schwartz
Attorney, Agent, or Firm—Albert P. Halluin

[57] ABSTRACT

In a process that involves use of a fluidized bed of solid particulate material wherein fluidization is obtained by passage of a gas through the bed, and the bed is stabilized by including discrete magnetizable particles in the bed and applying a substantially uniform magnetic field to the bed, temperature gradients that occur in the bed when the process in which the fluidized bed is used involves release or absorption of heat are reduced by periodically removing the magnetic field in a cyclical fashion. The period of magnetic field removal is long enough to destabilize the fluidized bed with respect to the positioning of fluidized particles so that the particles will move about in the bed, but the period of removal is not so long as to permit the unstabilized bed to exhibit a boiling or bubbling effect. The ratio of "on" time to "off" time is generally within the range of from about 4 to 1 to about 4000 to 1.

3 Claims, No Drawings

ENHANCING THE CHARACTERISTICS OF MAGNETICALLY STABILIZED FLUIDIZED BEDS

This is a division, of application Ser. No. 711,500, filed 8/4/76 now U.S. Pat. No. 4,143,469.

SUMMARY OF THE INVENTION

This invention concerns improvements in the stabilization of a fluidized bed of particulate solids that is employed in a process that involves the release or absorption of heat. More particularly, the invention concerns a process wherein a magnetically stabilized fluid bed of solid particles is periodically destabilized to a sufficient extent to permit some mixing of the component particles of the bed so as to reduce or remove undesirable temperature gradients that have developed in the bed, while at the same time preventing such great destabilization of the bed that the latter exhibits the well-known "boiling" or bubbling effect that is typical of an unstable fluidized bed operation.

BACKGROUND OF THE PRIOR ART

It is well-known that if a gas stream is caused to flow upward through a bed of solid particles at a sufficient rate of flow, the particles in the bed move freely instead of resting upon each other and the bed behaves much as a liquid. These fluidized solid particles exhibit buoyancy of floating objects, surface waves, and other properties normally associated with liquids. High rate of mixing and heat transfer is provided by such conventional beds, making them applicable to various drying, roasting, chemical and petroleum processes, as is also well known. A further advantage in the use of a fluidized bed in said processes is that the continuous addition and removal of the solids which make up the fluidized bed provides for convenient means for removal of fines formed by the breakdown of the solids and spent catalyst particles when said fluidized solids are used in a catalytic manner.

One serious disadvantage of gas-fluidized solids has been noted in the art, this being that as the velocity of the gas is increased to above a minimum value, bubbles are formed in the bed. A bubbling fluidized bed has regions of low solid density comprising gas pockets or voids, that are referred to as gas bubbles. The formation of bubbles leads to bypassing, slugging and channeling, which results in the loss of the intimate contact between the fluid and the solids that is expected in a fluidized bed process.

Various methods have been tried in the prior art to stabilize fluidized beds by preventing the bubbling or "boiling" phenomenon, including the use of corona discharges (U.S. Pat. No. 3,304,249) and applied magnetic fields (U.S. Pat. Nos. 3,439,899 and 3,440,731). A more recent solution to the problem is that provided by R. E. Rosensweig in copending U.S. application Ser. No. 610,071, filed Sept. 3, 1975, to which Belgium Pat. No. 834,384 corresponds. The present invention provides an improvement in the invention of Rosenweig when it is to be applied to processes that involve heat transfer either by release of heat or by the absorption of heat.

Briefly, in the Rosensweig invention there are included, in the bed of solid particulate material making up the fluidized bed, a plurality of separate, discrete magnetizable particles, and the bed is fluidized by a stream of gas flowing upward through the bed in the usual manner. There is applied to the fluidized bed a substantially uniform magnetic field which is oriented with a substantial vertical component. The strength of the magnetic field and its deviation from a vertical orientation are maintained so as to prevent formation of bubbles in the fluidized bed for the existing gas flow rate and particulate solids makeup of the bed. This enables use of gas throughput rates that are as much as 10 to 20 times as great as the flow rate of the gas at incipient fluidization in the absence of the applied magnetic field, concomitant with the absence of bubbles. Such a magnetically stabilized medium has the appearance of an expanded fixed bed; there is no gross solids circulation and very little or no gas bypassing. A bed of the magnetically stabilized medium shares many qualities of the normal fluidized bed; pressure drop is effectively equal to the weight of the bed and independent of gas flow rate or of particle size; the media will flow, permitting continuous solids throughput. Beds of the magnetically stabilized media also share some of the qualities of a fixed bed; countercurrent contacting can be readily attained; gas bypassing is small or absent, making it possible to achieve high conversions; and attrition is minimal.

Although magnetically stabilized fluid beds have a number of advantages over both fixed beds and the conventional fluidized beds, including low rates of particle attrition and high fluid flow rates at low pressure drops, they do have one inherent disadvantage, in that they have a very limited ability to permit the transfer of heat both between the fluidized bed and the walls that confine it, and within the fluidized bed to and from objects immersed therein to remove heat from or to add heat to the fluidized mass. The limited ability of such beds to transfer such heat is of little or no consequence in those cases where the beds are being used in processes that do not involve a large release or absorption of heat. In the great majority of applications of fluidized beds, however, chemical reactions and/or physical changes occur that are accompanied by thermal effects, as for example in evaporation or drying or in exothermal or endothermal reactions. Substantial increases in temperature within such fluidized beds can be undesirable for many reasons. For example, they can cause thermal degradation of fluids passing through the bed, changes in the selectivity of chemical reactions taking place in the bed, and thermal degradation of the particles in the bed, thereby shortening their useful lifetime. Also, when temperatures exceed the Curie temperature of the magnetic particles in the bed they will lose their magnetic properties and thus prevent stabilization of the bed with a magnetic field. Additionally, hot regions in the bed can cause gas expansion to the extent that the gas velocity in those regions exceeds the maximum velocity at which magnetic bed stabilization can be achieved for the strength of the magnetic field being employed.

Similarly, in those cases where heat is being absorbed rather than released during the process occuring in the magnetically stabilized fluidized bed, substantial declines in temperature in localized areas can also lead to undesirable conditions, including reduction in the rate of chemical reaction, reduction in the rate of physical change, condensation of a normally gaseous component of a fluid passing through the bed, and changes in selectivity of chemical reactions, whether catalytic or noncatalytic.

In addition to the above-noted problems, the nonisothermal nature of magnetically stabilized fluidized beds makes difficult the prediction of the behavior of such beds, in respect to both physical and chemical properties.

The present invention provides a method to improve thermal characteristics of magnetically stabilized fluidized beds, and overcomes the problem of thermal gradients in such beds, without sacrificing the advantages of such beds.

This novel method for control of thermal characteristics of magnetically stabilized fluidized beds consists of periodically removing the stabilizing magnetic field from the fluidized bed and then reapplying said field. The relative lengths of time in the "field on" and "field off" modes is determined from the characteristics of the bed and the nature of the processing that is occurring in the bed. The more exothermic or endothermic the process is, the less must be the ratio of the length of time the field is on to the length of time the field is off. This ratio may range from as small as 4 to 1 to as great as 4000 to 1, but the preferred range is from 8 to 1 to 400 to 1. The physical configuration of the magnetically stabilized fluidized bed (i.e., particle size and type, fluid velocity and physical properties, bed size and geometry and magnetic field strength, orientation and uniformity) determines the absolute period of "field off" mode of operation. Each case must be determined individually, using the criterion that the "field off" mode must end before the "boiling" or "bubbling" bed typical of unstabilized fluidized bed operation becomes evident.

Operation is cyclical, i.e., "field on" and "field off" modes follow each other in regular succession. During the "field on" mode, the magnetically stabilized fluidized bed begins to develop temperature gradients. Before these gradients become significant, the "field off" mode begins, during which the particles in the bed mix sufficiently to scramble any temperature gradients which appeared during the "field on" mode. The "field on" mode then resumes, whereupon temperature gradients may again begin to develop, only to again be scrambled by the "field off" mode; and so forth.

Careful selection of the length and frequency of the "field on" and "field off" modes is necessary for proper operation of this method of obtaining a magnetically stabilized fluidized bed that is essentially free of undesirable thermal gradients. The length and frequency to give the desired operation may be experimentally determined and the bed then run at that fixed condition of repetitive, "field on" and "field off" modes. Alternatively, the "field on" mode may be maintained until thermal sensors detect sufficient departure from desired absolute temperature levels or acceptable temperature gradients, whereupon the "field off" mode follows for the desired period, followed by reversion to "field on" mode; and so forth. In this case, the "field off" to "field on" ratio is not determined in advance and held fixed; rather the ratio is determined by the behavior of the process at any particular time.

In general, the duration of the "field off" mode will not exceed twice the residence time of the fluidizing gas in the bed; most preferably the time off will be equal to about the residence time of the gas. Residence time in most fluidized beds will be less than 20 seconds, more usually 4 to 10 seconds. In the example which follows, wherein the area of the bed was about 20 cm² and the gas flow rate was about 73.3 ml. per second, the gas residence time was about 4 seconds and the duration of the "field off" mode was 2 seconds. In general, the minimum time off should be determined by the desired level of mixing of the solids and the practical limits afforded by a control system for short times of the "field off" mode. The duration of the "field on" mode will be determined by the level of temperature increase or decrease or of concentrates profile desired or considered permissible in the particular process that is involved. It is to be remembered that the key factor is the obtaining of solids mixing without bubbling in the bed.

The following example gives a practical demonstration of this novel method to improve thermal characteristics of magnetically stabilized fluidized beds.

EXAMPLE

A cylindrical fluidized bed, 2-inch diameter, was filled with −80+100 mesh, commercial nickel on kieselguhr catalyst (static bed height 15 cm). The bed and feed gas were heated to 218° C. Feed gas composition was, by volume, 4.95% carbon monoxide, 20.2% hydrogen, balance nitrogen. At a feed gas flow rate of 4.4 liters/minute and an axially applied magnetic field of 508 gauss, the bed was fully fluidized and fully magnetically stabilized. The field was maintained on for 30 seconds, and then removed for 2 seconds, again followed by 30 seconds on and 2 seconds off, repeatedly. After a few minutes of cyclical operation, a bed height of 18.2 to 18.4 cm. was attained. Measurement of axial bed temperatures was made at various periods of time with the results shown in Table I, which follows:

TABLE I

| AXIAL BED TEMPERATURE MEASUREMENT (Cyclical Operation) | | | |
|---|---|---|---|
| | Temperature In °C. After Indicated Period of Operation | | |
| Distance From Bottom of Bed | 13 Min | 33 Min | 58 Min |
| 4 cm | 245 | 246 | 244 |
| 8 cm | 246 | 246 | 250 |
| 12 cm | 246 | 246 | 249 |
| 15 cm | 247 | 247 | 249 |

Assays by gas chromatography showed that the exit gas contained substantial methane, no carbon monoxide and some carbon dioxide, the latter being 0.34 mole per 100 moles of feed gas. Thus there was 100 percent conversion of the feed gas, carbon monoxide, substantially to methane, with some carbon dioxide being formed. Bed temperatures did not exceed 250° C. and axial differences did not exceed 6° C.

COMPARATIVE EXAMPLE

Operation of the fluidized bed of the above example was repeated with the same degree of preheat, the same catalyst, and the same feed gas and feed gas flow rate, but the magnetic field was held in the "on" mode constantly at 508 gauss, instead of being pulsed with alternate "on and off" modes. After several minutes of operation a bed height of 18 cm. was attained. Axial bed temperatures after 10 minutes and after 45 minutes were as shown in Table II, which follows.

TABLE II

| AXIAL BED TEMPERATURE MEASUREMENTS (Steady State) | | |
|---|---|---|
| | Temperature in °C. After Indicated Period of Operation | |
| Distance From Bottom of Bed | 10 Min. | 45 Min. |
| 4 cm | 319 | 307 |

TABLE II-continued

AXIAL BED TEMPERATURE MEASUREMENTS
(Steady State)

| Distance From Bottom of Bed | Temperature in °C. After Indicated Period of Operation | |
|---|---|---|
| | 10 Min. | 45 Min. |
| 8 cm | 253 | 246 |
| 12 cm | 254 | 247 |
| 15 cm | 259 | 249 |

Assays of the exit gas by gas chromatography showed no detectable carbon monoxide, no detectable carbon dioxide and substantial methane. Comparison of the above results show that in the steady state operation there was a much less isothermal operation than in the pulsed operation of Example 1, i.e., a spread of 61° to 66° C. in axial bed temperatures versus a maximum of 6° C. for the pulsed operation. It should be noted that the pulsed operation of Example 1 afforded close to isothermal operation without causing gas bypassing, which would have led to reduced conversion of carbon monoxide. Thus the pulsed operation permitted movement of the particles in the bed to provide thermal mixing without causing bubbling which would have led to gas bypassing. The more uniform bed temperature afforded by this invention is valuable in permitting better control of reactions occurring in fluidized beds and in providing better selectivity to desired products.

As disclosed in the Rosensweig invention, over which this invention constitutes an improvement, as discussed earlier in this specification, the widest range of stable behavior of the material in a magnetized fluidized bed is obtained when the applied field is uniform. Thus, when a field is applied having a substantial vertical component to stabilize the fluidized bed, the variation of the magnetic field to the mean field in the bed must not exceed 125% and is preferably no greater than 50% and most preferably no greater than 10%. The magnetizable solids in the bed preferably have a low coercivity, most preferably zero, and can comprise all ferromagnetic and ferrimagnetic substances, including but not limited to magnetic $Fe_3O_4$, $\gamma$-iron oxide ($Fe_2O_3$), chromium dioxide, ferrites of the form $XO\ Fe_2O_3$, wherein X is a metal or mixture of metals such as Zn, Mn or Cu; ferromagnetic elements including iron, nickel, cobalt and gadolinium, and alloys of ferromagnetic elements. The larger the magnetization M of the particle, the higher will be the transition velocity $u_t$ up to which the bed may be operated without bubbling, when all other factors are held constant. Preferably a magnetizable particle of the medium will have magnetization of at least 10 gauss.

The fluidized composition of matter may comprise substantially 100% of the magnetizable solid particles or it may comprise admixtures of said magnetizable solids with nonmagnetic materials. For example, such materials as silica, alumina, metals, catalysts or coal may be admixed with the above materials and the advantages of the instant invention still obtained. However, it is preferred that the volume fraction of magnetizable particles exceed 25%.

Preferably, the fluidized materials will range in particle size from about 0.001 mm to about 50 mm, more preferably from about 0.05 mm to about 1.0 mm. Particles of greater dimensions will usually be difficult to fluidize, while smaller size particles will be difficult to contain in any fluidized process.

This invention will find use in various processes that can employ fluidized beds, including but not limited to catalytic cracking, fluid hydroforming, isomerization, coking, polymerization, hydrofining, alkylation, partial oxidation, chlorination, dehydrogenation, desulfurization or reduction, gasification of coal, fluid bed combustion of coal, and retorting of oil shale.

Although this invention has been exemplified by the use of a fluidization chamber that is operated in the presence of a gravitational force field, it is evident that one could use other force fields, provided the flow of fluidizing gas is in the direction opposing the external force field. Thus, for example, the force field may be produced by centrifugal forces of a rotating system, or by the electrical force on charged matter in an electrostatic field, or by the dielectrophoretic force of electrically polarized matter in an electrostatic field having a field gradient, or by forces caused by presence of a magnetic field gradient, or by Lorentz force resulting from passage of a current at an angle to a magnetic field, or by combinations of the foregoing.

What is claimed is:

1. In a process for fluidizing a bed containing solid particulate magnetizable, fluidizable material within an external force field, wherein said bed of fluidizable material is fluidized by a flow of gas therethrough with sufficient force to oppose an external force field acting on said particulate material, and wherein said fluidized bed is subjected to a magnetic field having a substantial component positioned in the direction of said external force field, the improvement which comprises: periodically removing the magnetic field from the fluidized bed so as to promote mixing of the solids in the fluidized bed and then reapplying the magnetic field before the bed visibly exhibits "boiling" or "bubbling" typical of unstabilized fluidized bed operation.

2. The process of claim 1 wherein said external force field is gravity, said gas flow through said bed is in a generally upward direction, and said magnetic field has a substantially vertical component.

3. The process of claim 1 wherein the solid particulate magnetizable, fluidizable material is a catalyst comprised of nickel on kieselguhr.

* * * * *